US011625271B2

(12) United States Patent
Di Cairano-Gilfedder et al.

(10) Patent No.: US 11,625,271 B2
(45) Date of Patent: Apr. 11, 2023

(54) NETWORK RESOURCE MANAGEMENT

(71) Applicant: BRITISH TELECOMMUNICATIONS PUBLIC LIMITED COMPANY, London (GB)

(72) Inventors: Carla Di Cairano-Gilfedder, London (GB); Kjeld Jensen, London (GB); Gilbert Owusu, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 29 days.

(21) Appl. No.: 15/571,381

(22) PCT Filed: Apr. 29, 2016

(86) PCT No.: PCT/EP2016/059657
§ 371 (c)(1),
(2) Date: Nov. 2, 2017

(87) PCT Pub. No.: WO2016/188706
PCT Pub. Date: Dec. 1, 2016

(65) Prior Publication Data
US 2019/0155651 A1      May 23, 2019

(30) Foreign Application Priority Data
May 22, 2015   (EP) .................................... 15275142

(51) Int. Cl.
*G06F 9/50*      (2006.01)
(52) U.S. Cl.
CPC .......... *G06F 9/5011* (2013.01); *G06F 9/5061* (2013.01); *G06F 9/5083* (2013.01); *G06F 2209/5014* (2013.01)

(58) Field of Classification Search
None
See application file for complete search history.

(56) References Cited

U.S. PATENT DOCUMENTS

| 6,775,701 B1 | 8/2004 | Pan et al. |
| 7,894,361 B1 | 2/2011 | Bhan et al. |
| | (Continued) | |

FOREIGN PATENT DOCUMENTS

| WO | WO 2004/040848 | 5/2004 |

OTHER PUBLICATIONS

International Search Report for PCT/EP2016/059657, dated Aug. 25, 2016, 3 pages.
(Continued)

*Primary Examiner* — Wynuel S Aquino
(74) *Attorney, Agent, or Firm* — Nixon & Vanderhye P.C.

(57) ABSTRACT

A data management process determines, from user-implemented provisional reservations (400) for data processing resources, a projected total capacity requirement for each said data processing resource, by maintaining a record (9, 90, 91) recording previous such reservations made by each user and comparing each reservations with records (87, 88, 89) of the actual resources used, to provide an estimate of resources required to meet the projected capacity requirement, and to provide data for a demand management processor (2), which control associated configurable data processing equipment (1) to provide the resources required to meet the estimated capacity required. The process takes (Continued)

account of over- and under-ordering of capacity by comparing each reservation (400) with the use actually made (600), and includes a record (10) of ad-hoc (unreserved) usage.

15 Claims, 3 Drawing Sheets

(56) References Cited

U.S. PATENT DOCUMENTS

| | | |
|---|---|---|
| 2005/0073954 A1 | 4/2005 | Bodin et al. |
| 2005/0132051 A1 | 6/2005 | Hill et al. |
| 2006/0120282 A1 | 6/2006 | Carlson et al. |
| 2007/0011683 A1* | 1/2007 | Helander .............. G06F 9/4887 718/104 |
| 2008/0172673 A1 | 7/2008 | Naik |
| 2008/0307425 A1* | 12/2008 | Tripathi ................ G06F 9/5077 718/104 |
| 2011/0213686 A1 | 9/2011 | Ferris et al. |
| 2012/0221454 A1 | 8/2012 | Morgan |
| 2013/0191843 A1* | 7/2013 | Sarkar .................... G06F 9/505 718/105 |
| 2014/0108639 A1 | 4/2014 | Nelke et al. |
| 2014/0215080 A1* | 7/2014 | Alabiso .............. H04L 41/5054 709/226 |
| 2015/0199218 A1* | 7/2015 | Wilson ................. G06F 9/5011 718/104 |
| 2015/0235144 A1* | 8/2015 | Gusev .................. G06F 9/5011 706/12 |
| 2016/0253215 A1* | 9/2016 | Fang ................... G06F 11/3442 718/104 |
| 2018/0267832 A1* | 9/2018 | Biener ................. G06F 9/5061 |

OTHER PUBLICATIONS

Search Report for EP15275142, dated Nov. 19, 2015, 4 pages.
Ching Chuen Teck Mark et al., "Evolutionary Optimal Virtual Machine Placement and Demand Forecaster for Cloud Computing", Advanced Information Networking and Applications (AINA), 2011 IEEE International Conference on Advanced Information Networking and Applications, Mar. 22-25, 2011, pp. 348-355.
Paschalidis and T. Tsitsiklis, "Congestion-dependent pricing of network services", IEEE/ACM Transactions on networking, vol. 8, No. 2, Apr. 2000, 14 pages.
Antonio Guerrero-Ibanez et al., "A QoS-based dynamic pricing approach for services provisioning in heterogeneous wireless access networks", Pervasive and Mobile Computing 7 (2011), pp. 569-583.
Pamela Aloo et al., "Fuzzy Logic Based Dynamic Pricing Scheme for Provision of Qos In Cellular Networks", French South Africa Technical Institute of Electronics, 2010 International Conference on Wireless Information Networks and Systems (WINSYS), Jul. 26-28, 2010, 8 pages.
Hong Xu et al., "Maximizing Revenue with Dynamic Cloud Pricing: The Infinite Horizon Case", IEEE ICC 2012—Next-Generation Networking Symposium, pp. 2929-2933.
Wubin Li et al., "Cost-Optimal Cloud Service Placement under Dynamic Pricing Schemes", 2013 IEEE/ACM 6th International Conference on Utility and Cloud Computing, pp. 187-194.

* cited by examiner

NETWORK RESOURCE MANAGEMENT

CROSS REFERENCE TO RELATED APPLICATIONS

This application is the U.S. national phase of International Application No. PCT/EP2016/059657 filed 29 Apr. 2016, which designated the U.S. and claims priority to EP Patent Application No. 15275142.6 filed 22 May 2015, the entire contents of each of which are hereby incorporated by reference.

FIELD OF THE INVENTION

The present invention relates to a mechanism for management of dynamically allocated cloud computing and communication resources, and in particular to predict demand for such resources. The invention can be used to support on-demand cloud services (IT or network) through resource reservation system control. It may be implemented as a cloud-based solution which maintains a real-time view of resources demand, exposes availability to users via a web-interface, and reserves resources requested by users.

BACKGROUND TO THE INVENTION

Similarities exist between the IT industry and service industries like transport or entertainment, in particular capital investment versus marginal cost distinction. In such industries once the infrastructure is in place, the cost of providing the service is largely independent of the use that is made of it, providing that demand is always at or below a certain fraction of the installed capacity, but there are disproportionate increases in cost if demand exceeds such fraction of capacity by even a small amount (a new server or cable, for example). Some costs vary in a non-linear way with demand, being relatively constant for moderate levels of use, but requiring congestion management as demand approaches a certain fraction of the installed capacity. Another similarity with service industries is that demand can be highly variable, albeit with predictable patterns. There are also factors which vary with usage in a non-linear way. The present invention relates to a methodology for forecasting this variable demand in an IT/communications cloud system and controlling the associated resource reservation system.

Paschalidis and T. Tsitsiklis, *Congestion-dependent pricing of network services*, [IEEE/ACM Transactions on networking, Vol 8, n. 2, April 2000] discuss the use of congestion-dependent pricing policies to maximise revenues from circuit-switched calls. It shows that for static demand functions, fixed prices (i.e. prices only potentially varied by time-of-day) are asymptotically optimal under the assumption of exponentially distributed call holding times and the system behaving as a loss system. However, the framework discussed by Paschalidis and Tsitsiklis requires fixed prices and is not suitable for non-static demand patterns and holding times that are not necessarily exponentially distributed.

Cloud resources are a combination of multiple resources, e.g. links and IT resources, and unlike other service industries, costs are not always constant, since as discussed earlier a small increase in demand may lead to disproportionate increase of cost.

Cloud computing service providers typically offer customers certain performance guarantees, e.g. availability, and/or upper bounds on performance metrics such as delay, loss, and jitter. If these guarantees are not met, the cloud provider would be expected to compensate its customers. Compensation could be in terms of credits for future resource usage, financial refunds, or other measures.

Any resource used in real-time and having capacity constraints, is a "perishable" commodity, with specific and clearly-defined expiry dates. Unlike physical goods, excess capacity cannot be stockpiled against future periods of high demand, and once the scheduled time for an element of capacity (communications bandwidth, computing processing power, etc.) has passed, the resource instantly ceases to have any utility or value. It is therefore necessary to predict and, where possible, manage demand for such resources to minimise the need for extra capacity that would be necessary to cover periods of high demand that are too short, or too rare, to recoup the cost of creating and maintaining the resources necessary to meet that demand, in particular if existing resources are idle at other periods when demand is lower.

In many situations, installed capacity can be considered a sunk cost and that, once installed, there are no additional costs incurred by the amount of use made of that capacity. However, in practice there are costs associated with running close to capacity, as when a resource is congested, a small increase in demand may lead to disproportionate increase of cost. This is because persistent congestion gives rise to violation of obligations under service level agreements (SLAs), for example longer queuing delays may be experienced by packets in buffers that serve congested links. Over longer time-scales congestion is costly as it triggers capacity upgrades or data centre facilities' expansion.

This means that a provider's marginal cost of providing a resource is non-zero and depends upon utilisation level. At long timescales of months to years, the variables that a provider can influence are averages or percentiles of performance metrics such as delay, packet loss, and jitter, by means of resource capacity planning and traffic engineering; doing so allows the provider to both maximise customers' experience and avoid penalties for SLA-bound services.

A general conclusion, obtained both by simulation and analytical approaches, is that there is a non-linear relationship between network utilisation and performance metrics such as delay and loss. This is illustrated in FIG. 3, which depicts a measure of resource cost—specifically the degree of congestion—plotted against the degree of utilisation of the resource.

It will be noted from curve 300 of FIG. 3 that, at low utilisation levels, the cost of adding further users is very low. However, as utilisation increases conflicts between users increase, indicated by the increase in the gradient of curve 300. Congestion can also cause a reduction in service quality, which can also be quantified as a cost. In particular, in context of link bandwidth there is an increased chance of collisions between transmitted packets, resulting in a greater likelihood of delay before a vacant slot becomes available. As utilisation approaches unity (100%), this cost increases exponentially, tending to infinity at 100% utilisation—when demand exceeds supply the queue of data will never clear and, when buffers are full, packets are dropped hence impacting not only delay but also loss (curve 301).

For modelling purposes, and in particular billing, these costs may be represented by a set of linear segments 304, with the gradient (the cost charged per user) increasing stepwise. In particular, the cost attributed to 100% utilisation is attributed a non-infinite value for billing purposes.

There then comes a step change 302 as, in order to meet any demand in excess of 100% of capacity, the capital cost of installing further capacity is required. Once that capacity is installed, the marginal cost of fulfilling requests again increases very slowly as seen at curve 303, (starting from a higher baseline 305) but the cost 302 of installing it is not recovered until a significant proportion of the new capacity is taken up (the point 306 where the income 304 once again exceeds the operational costs 303). The consequence of this relationship is that load and resource management becomes more critical as utilisation of the resources increases.

It is therefore desirable to manage demand for computing and network cloud resources dynamically, for example by variable pricing, to optimise utilisation within the cloud's lifetime. Due to the intrinsically variable and multi-tenant nature of cloud services, it is challenging to estimate resources' availability at a given time, and their expected performance. In order to manage the demand, it has to be predicted using non-static statistics-based techniques under multiple constraints such as customer demand/preferences and available resources.

If consumption rates can be smoothed, for example by time-dependant dynamic pricing, the cloud provider would not have to dimension its network to support un-managed peak loads, as peak-time utilisation rates would be lower, reducing the need for expensive capacity upgrades which would only be utilised, and thus earn revenue, for short periods.

In practice, in any given session, a user may use more, or less, capacity than was reserved for that session. The decision as to how much capacity to reserve will depend on how important it is to the user to have that capacity available for a possible contingency, how much risk he is prepared to tolerate the cost of additional un-reserved ("best efforts") capacity on demand should an over-run be required, (and the risk that such capacity is not available) and of course the relative costs of reserving capacity that may not be required against paying a premium for on-demand (un-reserved) capacity.

It is known, for example for U.S. Pat. No. 6,775,701 (Pan) to use "fuzzy" logic to apply a risk factor to determine the level of resource that may be provisioned, by evaluating the current level of resources usage and bookings (reservations) against the past usage profile, to determine how much risk is being taken that aggregate demand cannot be met, for a given degree of overbooking. However, it only deals with the usage patterns in the aggregate and not with individual user behaviour.

Dynamic demand management systems are intended to keep demand for the service at a level where these performance guarantees can be maintained. It is therefore desirable to be able to predict both resource availability, and a measure of the resources required to meet that availability. This latter measure will be referred to as the "cost" of providing the resources, but it should be understood that it is the physical resources themselves, such as computing power, bandwidth, etc. which are being measured, rather than any monetary value they may have.

SUMMARY OF THE INVENTION

According to a first aspect of the invention, there is provided a data management process which determines, from user-implemented provisional reservations for data processing resources, a projected total capacity requirement for each said data processing resource within the network required for the network to meet the aggregate requirements of the users, by recording previous provisional reservations made by each user and comparing each reservation with the actual capacity used by the user making the reservation, to provide an estimate of resources required to meet a projected capacity required to meet the provisional requests, and to control associated configurable data processing equipment to provide the resources required to meet the estimated capacity required.

In the preferred embodiment, a record of previous provisional reservations for the said resources by the said users is compared with a record of previous actual use of the said resources by the said users to generate a prediction of under- or over-reservation of resources, so to generate an estimate of the resources needed to meet a set of currently pending reservations.

Unreserved requests for resource may be monitored and a record stored of such requests, and a forecast generated of the resources required to meet unreserved requests over a period in respect of which the said provisional requests relate, such that the resource projected to meet the projected use relating to the provisional reservations and the unreserved requests is determined.

The process may be used to allocate resources and configure them to specific purposes to meet the estimated capacity required. The allocation of resources may be based on the estimated capacity required with an additional contingency surplus derived from the variability of the historic usage levels of the resources.

Another aspect of the invention provides apparatus for monitoring the operation of a data management network, comprising:

a store for recording records of actual use of resources of the data management network by individual users, and records of provisional requests made for the resources, a demand analysis engine for receiving provisional requests for use of the resources and deriving an estimate of resources required to meet a projected total capacity required for each resource within the network required for the network to meet the aggregate requirements of the users, by comparing data relating to previous reservations with the data relating to actual usage by the respective users making the reservations, a resource management system controlled by the demand analysis engine arranged to configure data processing resources to meet the projected requirements.

The apparatus may further comprise a store for data relating to unreserved requests recorded by the resource management system, and wherein the demand analysis engine is arranged to receive the unreserved request data and use it in the generation of the projected total capacity requirement.

In embodiments of the invention, a processor monitors demand made in advance for a resource such as bandwidth, and predicts actual usage using historic data on under- or over-booking of resources (e.g. reservations not being taken up (no-shows), or actual usage exceeding that booked (overriding), or un-booked ("on-demand" "best-efforts") usage), both by the users who have made the specific bookings and, with a lower weighting, more generally. It can be used to manage dynamic pricing systems, it can also be used to allocate resources and configure them to specific purposes to meet expected demand for those purposes, in addition it can be used to schedule infrastructure downtime for maintenance, or to determine when extra capacity needs to be leased.

In the embodiment to be described, the difference between provisional requests and actual demand, as determined by the inventive principle, is aggregated over a number of users, and includes a contingency surplus in addition to the allowance made for un-booked (instant) requests and for under-use: that is, capacity reserved by a user but not used by that user.

BRIEF DESCRIPTION OF THE FIGURES

In order that the present invention may be better understood, embodiments thereof will now be described, by way of example only, with reference to the accompanying drawings in which:

FIG. 4 is a flow chart illustrating part of the process of this embodiment

DETAILED DESCRIPTION OF PRESENT EXAMPLE EMBODIMENTS

Figure 1:
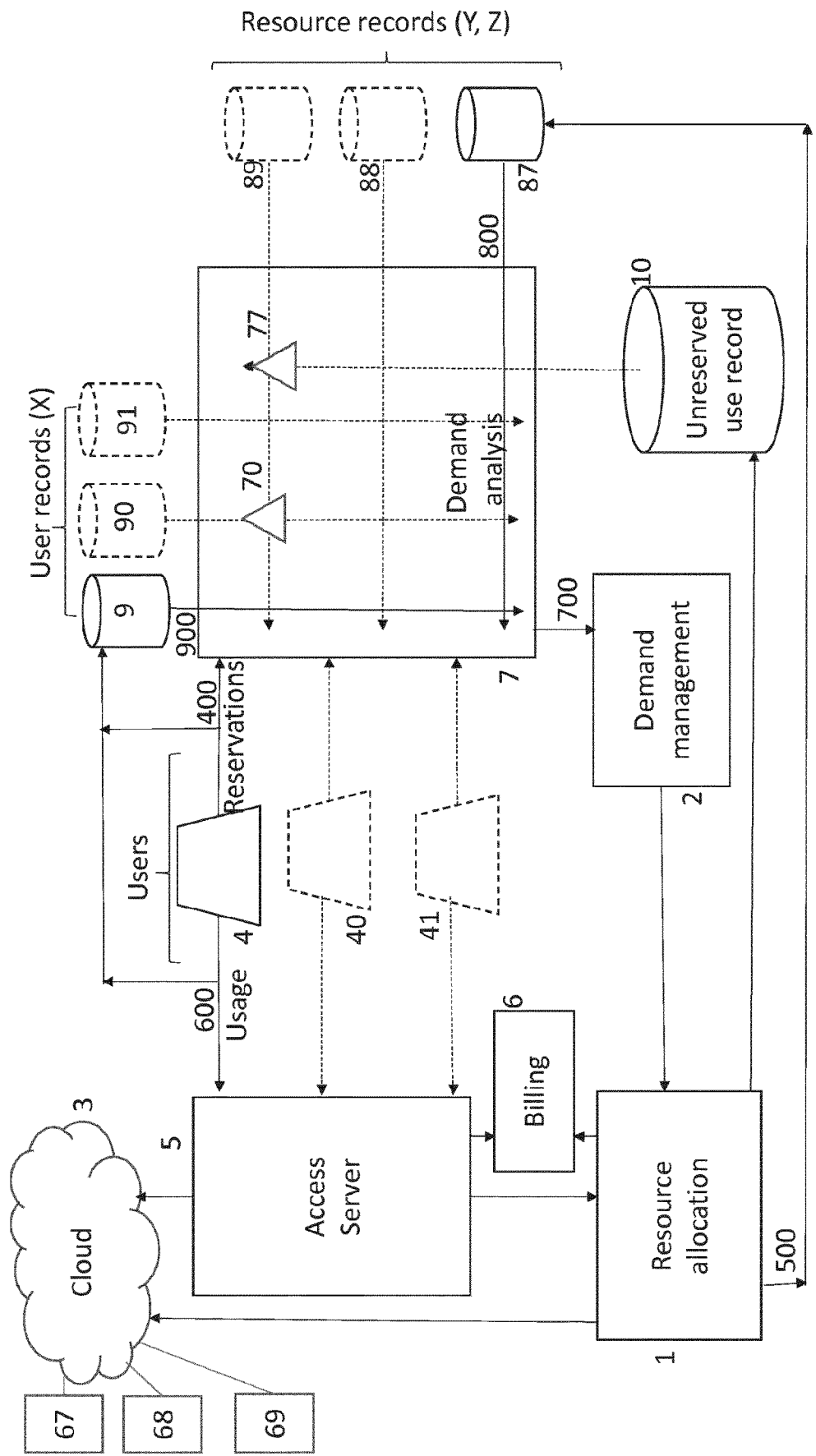
FIG. 1 is a schematic representation of the functional elements which co-operate to perform the embodiment of the invention.

As depicted in FIG. 1, a resource allocation system 1 controls the allocation and configuration of resources 67, 68, 69 in the infrastructure of a "cloud" computing resource 3. These resources may include communications bandwidth, computing power, storage of data generated by the service to be accessed, accessibility of previously-stored data (for example retrieval of data from a store to a cache local, in network terms, to the processor that is to use that data), and the configuration process will take into account how such resources are configured, for example the protocols under which they are able to operate, and consequently their suitability for handling different types of information content, such as prioritisation between competing constraints such as latency (speed) and accuracy (error correction).

The resource allocation system also provides input to a billing system 6, to generate cost-dependent tariffs.

Individual users 4, (40, 41 etc.) make access requests 600 to the cloud resources 67, 68, 69 through an access server 5. For clarity interactions with only one user 4 will be discussed in detail, but it will be understood that the invention interacts with all users in analogous manner. The access server 5 also provides information to the billing system 6 on the actual usage by each user. As the billing system 6 can operate dynamically under the control of the resource allocation system 1, the access server 5 may be arranged to report the relevant tariffs to the user 4 before accepting confirmation of an access request.

A demand analysis system 7, the operation of which will be described in more detail later, is configured to predict demand for the various cloud services. This analysis system uses a number of inputs to make these predictions. Some of these inputs are fixed, such as scheduled reservations 400, etc. for services made by individual users 4, 40, etc. Others are estimates based on historical data of services' usage. In particular, historical data 9, 90, 91 etc. on each individual user's previous service requests 400 and actual use of the system 600 is maintained.

In practice, in any given session, a user may use more, or less, capacity than was reserved for that session. The decision as to how much capacity to reserve will depend on how important it is to the user to have that capacity available for a possible contingency, how much risk he is prepared to tolerate that additional un-reserved ("best efforts") capacity will be available on demand should an over-run be required, and of course the relative costs of reserving capacity that may not be required against paying a premium for on-demand (un-reserved) capacity.

The demand analysis system 7 compares the reservation request records 9, 90, 91 with records 87, 88, 89 etc. of the actual use made of the resources, recorded from data 500, 600 generated when use is made of the resources in response to each request made by the individual users 4, 40, etc. This allows a determination to be made of what proportion of reserved capacity is typically actually used by each user 4, 40, 41 etc.

In addition to the individual user records 9, (90, etc.), and resource records (8, 80, . . . etc.) a record 10 is maintained of ad-hoc users making un-reserved use of the resources (as distinct from an over-run of resources which have been reserved).

As a matter of practicality, it is preferred to prioritise over-run of reserved usage over other "best efforts" un-reserved usage, in order that the reserved resources are not wasted because of insufficient extra resources being available to complete the task for which they were reserved. The billing system may take account of this prioritisation by charging a higher tariff for over-run of reserved usage than for ad-hoc un-booked use.

A demand management system 2 determines what resources are required to provide the services predicted by the demand analysis system 7, and generates instructions to the resource allocation system 1 to configure the various cloud elements 67, 68, 69 to provide the required resources.

The performance of the embodiment can be understood as operating in three phases:

(i) a first forecasting phase, managed by the analysis processor 7;

(ii) a second demand management phase managed by the demand management processor 2 and resource allocation server 1;

(iii) a third usage phase managed by the access server 5.

In practice the three phases will operate in parallel, as the forecasting phase provides inputs 700 to the demand management phase, the demand management phase controls the resources to be used by the usage phase, and the usage phase provides feedback data 10, 800, 900 for further iterations of the forecasting phase.

For each user record (e.g. 90) the demand analysis system determines from the respective user record and the resource records 87, 88, 89, the typical pattern of use that the user makes of each resource to produce an overall demand pattern, of which one element 70 is shown. A further store records, for each resource 87, 88, 89 a record of the "drop-in" use made of the resource and this is used to provide further data-points (e.g. 70, 77) in the demand pattern. This aggregated use record identifies requests in respect of which no initial reservation was made.

The demand analysis processor therefore has data relating to what level of use 600 might be expected from each user 4, 40, 41 etc. compared with that actually reserved 400 by those users. Such a measure may not, on its own for an individual user, be a statistically significant indicator of the user's future behaviour but, when such measure is aggregated with similar predictions of the behaviour of many other users making requests for capacity at the same period, it can provide an indication of likely demand, and some indication of how accurate this estimate is likely to be and therefore what contingency allowance needs to be added to this. This predicted demand can be adjusted (typically increased) by a further value 10 to take account of the predicted demand for un-reserved capacity, as reported by the resource allocation system.

Figure 2:
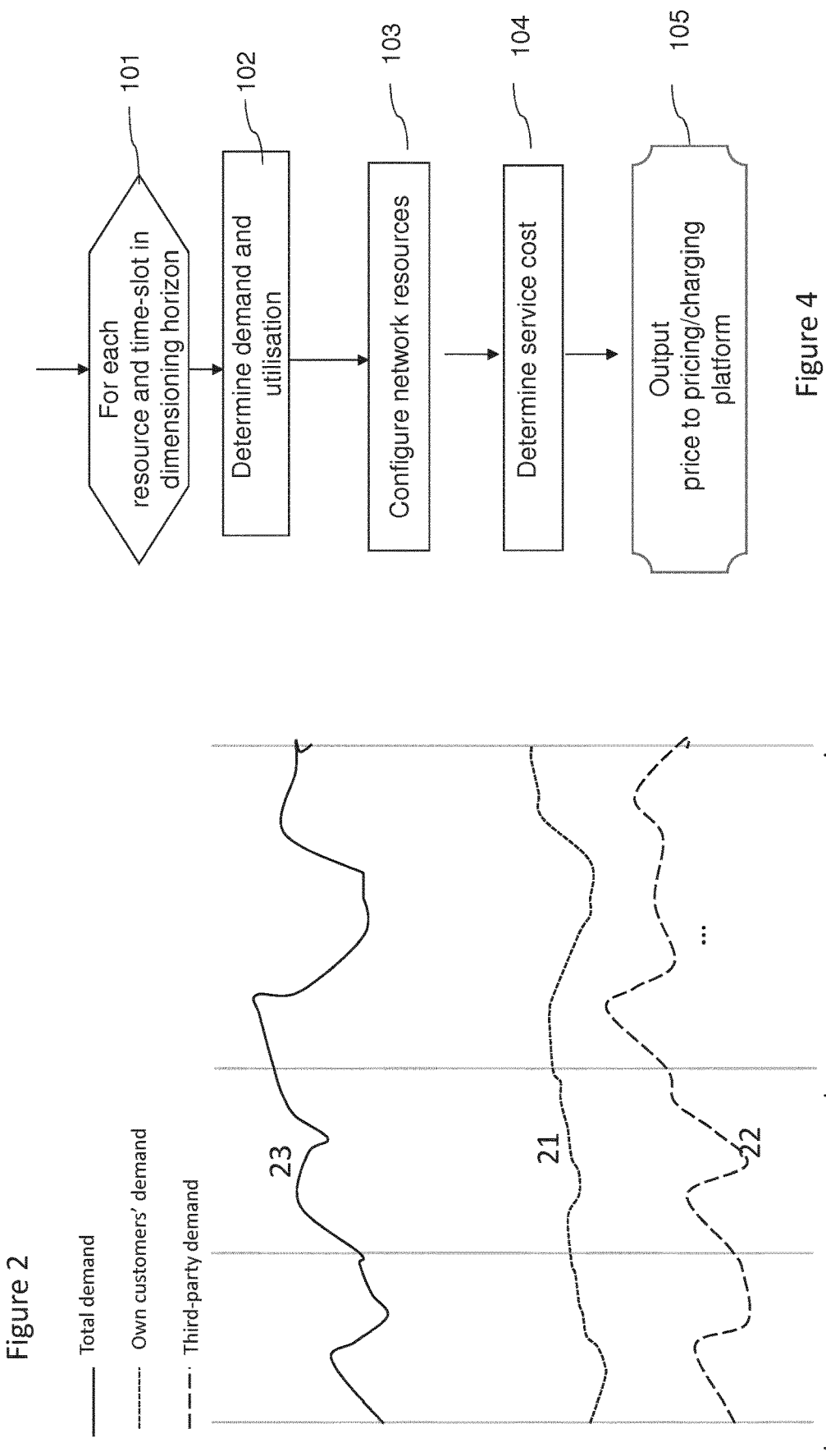
FIG. 2 is an illustration of a variation of demand over time

The demand analysis processor 7 provides a methodology that predicts the required availability in each time-slot [ti, ti+1] of resources such as IT resources such as a Virtual Machine (VM) or a bandwidth route (collection of link bandwidth between two end-points). As depicted in FIG. 2, such demand can vary over time. The utilisation may be the result of requests both from the operator's own clients (pecked line 21) and from external parties (dashed line 22), either accessing the system directly on an ad-hoc basis or accessing services offered by the operator's own clients which requires those clients to access IT resources (e.g. in hybrid cloud environment). The resulting demand curve, as shown in FIG. 2 by the solid line 23, is not deterministically variable but includes unpredictable elements. The embodiment to be described provides a means of managing the system such that a practical margin can be determined to allow for these unpredictable elements, and ensure that resources are in place to meet the predicted demand, or if that is not possible, to identify periods when the demand needs to be managed to meet capacity constraints. The measures that might be used to manage the demand once such periods are identified by this embodiment will not be discussed in detail as they are typically commercial (e.g. by tariff adjustment).

As shown in FIG. 4, the embodiment operates by first calculating the expected demand R for each cloud resource, -Y, Z e.g. 67, 68, 69 and time-slot [ti, ti+1], within a predetermined planning horizon, and deriving the expected utilisation U=R/A (where A is resource capacity, e.g. link capacity). (Steps 101, 102). The expected demand R is determined as follows.

For each cloud resource Y, Z e.g. 67, 68, 69 historical usage is maintained in the database 87, 88, 89 which is updated every time the resource is used, and a record of historical demand is maintained in the database 9, 90, 91, as shown for example in the tables below for resources Y and Z:

| Resource Y (1 yr moving record) | Total Services purchased (Jx) | Total Services with non-zero adjustment (Fx) | Demand Adjustments (Gx) |
| --- | --- | --- | --- |
| Customer 1 | 8 | 1 | g1 |
| Customer 2 | 5 | 2 | w1, w2 |
| ... | | | |
| Customer n | 2 | 1 | s1 |

| Resource Z (1 yr moving record) | Total Services purchased (Jx) | Total Services with non-zero adjustment (Fx) | Demand Adjustments (Gx) |
| --- | --- | --- | --- |
| Customer 1 | 10 | 3 | g1, g2, g3 |
| Customer 2 | 6 | 2 | w1, w2 |
| ... | | | |
| Customer n | 7 | 2 | s1, s2 |

For each resource, the table contains the following data (only depends on historical usage, e.g. 1 year window):
for each customer X (e.g. user 4, 40, 41)
Jx=Σ number resource reservations in past period (e.g. 1 year period) as recorded in the request database 9 (first column)
Fx=Σ number resource reservations which had a non-zero demand adjustment in the past period. That is to say, the number of records in the usage database 8 which corresponds to the request in the request database 9 (second column)

List of Demand adjustment Gx, for each service which had a non-zero demand adjustment in past period—that is to say, the records of differences between the resource requests recorded in the request database 9 and the corresponding usage in the database 10. Note that either database 9, 10 may have a zero entry corresponding to a non-zero entry in the other database, representing respectively a reservation that was not used, or an ad hoc unreserved use of the resources (third column)

The value of Gx is calculated as follows. For each cloud resource Y and customer X that has reserved the resource at least once in the past period, the following data is recorded for each reservation. The data is typically recorded after the service has been completed.

Step 1: Divide reservation duration interval [ti, $t_{i+1}$] in n sub-intervals with fixed length L. For the purposes of this illustration the value of L is assumed to be the same for all services and customers, e.g. 5 mins. It follows that n=($t_{i+1}$−ti)/ L (e.g. if L=5 mins and the duration interval is 1 hour then n=12, whereas if the service lasts 2 hours then n=24).

Step 2: Assuming r was the reservation capacity:
calculate interval of tolerance [r*(1−δ), r*(1+δ)] for random variability of consumption, with 0<δ<1. The value of δ can be selected by the network operator according to how much over- or under-use of reserved resources is to be provided for.
measure average consumption $r_i$ in each of the i sub-intervals with i=1, . . . , n
calculate Di deviation in each sub-interval, such that:

$$Di = \begin{cases} r_i - r^*(1+\delta) & \text{if } r_i > r^*(1+\delta) \text{ or} \\ r_i - r^*(1-\delta) & \text{if } r_i < r^*(1-\delta) \\ 0 & \text{otherwise (i.e. if } r_i \text{ falls within the interval of tolerance)} \end{cases}$$

define Gx=mean Di (interpreted as mean deviation, averaged over time—for that reservation).
For each cloud resource Y, Z, identify set of customers S from booking system that have a reservation in time-slot [ti, ti+1)
Then for each customer X in this set S (normally a sub-set of the entire set whose records are kept in the tables listed in the previous tables), determine the demand adjustment component Ax as follows:
define Mx=mean of Gx (mean adjustments made by customer X in relation to resource Y: this is the average—of the values in the list in the $3^{rd}$ column of the table above)
define Ex=Fx/Jx (expectation deviation occurrence, as determined from the table above). This value is the proportion of requests from that customer which deviated from the booked capacity.
define Ax=Mx*Ex demand adjustment component. This value therefore is a measure of the average adjustment made by that user X, taking into account those requests where no adjustment was required.

This value can be used to generate an estimate of how much of each resource a user requests he is likely to actually make use of. This figure may be more or less than 100%, depending on his past usage pattern. This value may vary considerably in an individual request compared to his own average, so that the statistical likelihood of a particular request being taken up to the amount close to that figure may be relatively low. However, aggregating the values of Ax over-all users user X in S allows a measure of the expected utilisation of each resource Y, Z.

The demand analysis processor 7 then provides an output to a demand management processor 2 which controls the resource allocations system 1 to configure the network 3 to provide the resources necessary to meet the projected demand (step 103).

Figure 3:
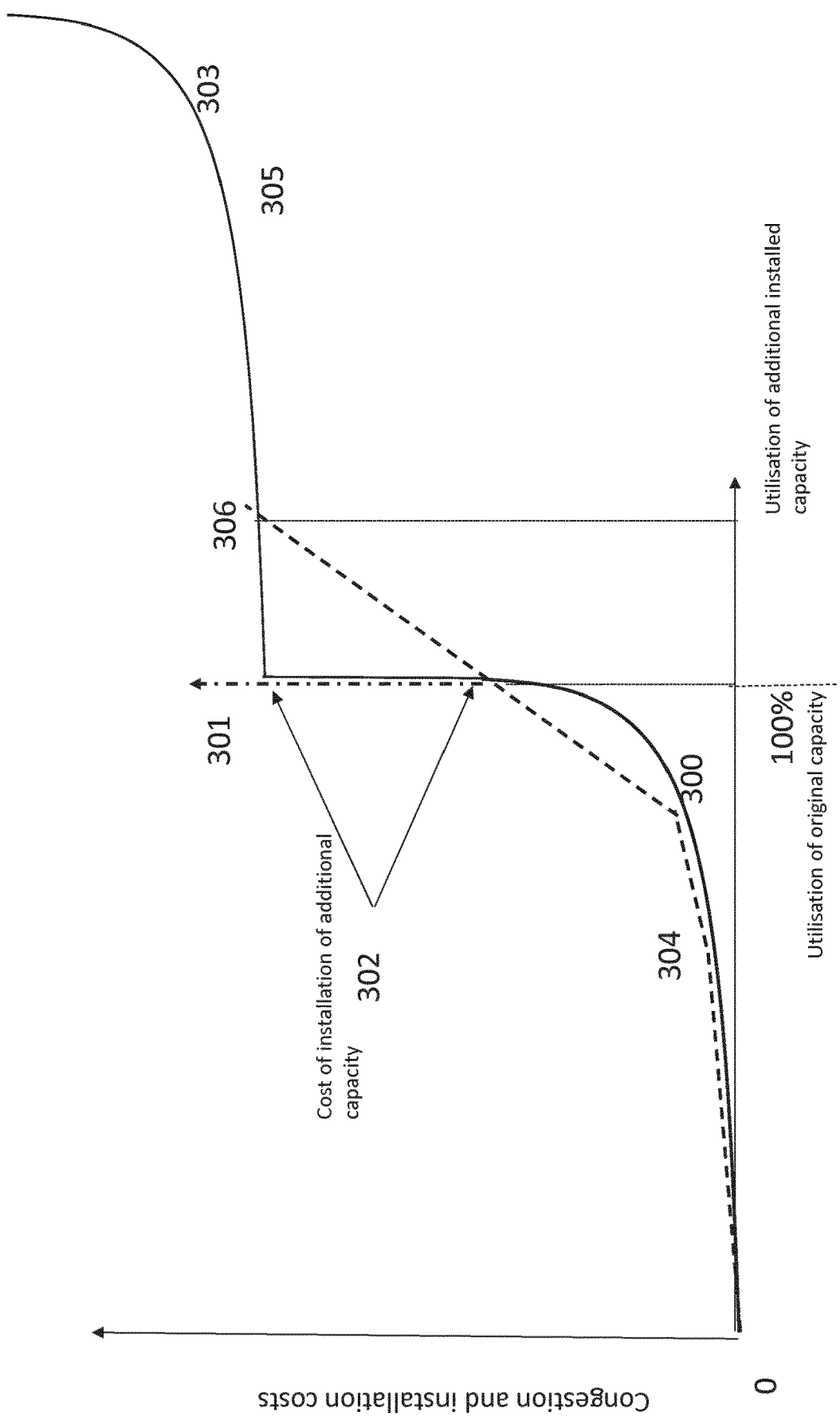
FIG. 3 is a depiction of the variation of cost with utilisation, and a linearised approximation thereto

The resource allocation system 1 can also identify periods when resources cannot be configured to meet projected demand and generate a dynamic service cost (step 104) to input to the billing system 6 (step 105) to adjust billing rates so as to discourage demand at peak times and/or encourage shift of demand to other periods. The process can operate dynamically, so that as projected demand for a particular period approaches the available capacity, the billing rate can be adjusted in respect of new provisional requests for that period in order to slow down the number of requests received. Typically a costing may be adjusted as the available capacity is used up step wise, as indicated by the gradient of the dashed line 304 in FIG. 3, in order to reduce the likelihood of reaching 100% utilisation.

The invention claimed is:

1. A data management process comprising:
   determining, from user-implemented provisional reservations for data processing resources, a projected total capacity requirement for each said data processing resource within a network required for the network to meet aggregate requirements of users in each of a plurality of time slots, by recording previous provisional reservations made by each user of a plurality of users to reserve capacity during a session associated with each reservation and comparing each reservation with an actual capacity used by the user making the reservation during the session associated with each reservation and determining, for each user of the plurality of users, a value of a proportion of such reservations in which the actual capacity used deviates from a capacity reserved by the user, and aggregating each of the values of the proportion of such reservations in which the actual capacity used deviates from the capacity reserved by each user of the plurality of users to provide an estimate of resources required to meet the projected total capacity requirement to meet the provisional reservations, and
   controlling associated configurable data processing equipment to provide the resources required to meet the projected total capacity requirement in each time slot.

2. A data management process according to claim 1, wherein a record of previous provisional reservations for the resources by the users is compared with a record of previous actual use of the resources by the users to generate a prediction of under- or over-reservation of resources, so to generate an estimate of the resources needed to meet a set of currently pending reservations.

3. A data management process according to claim 2, wherein unreserved requests for resource are monitored and a record stored of such requests, and a forecast generated of the resources required to meet unreserved requests over a period in respect of which the provisional reservations relate, such that the resource projected to meet the projected use relating to the provisional reservations and the unreserved requests is determined.

4. A data management process according to claim 1, wherein the process allocates resources and configures them to specific purposes to meet the projected total capacity requirement.

5. A data management according to claim 4, wherein the allocation of resources is based on the projected total capacity requirement with an additional contingency surplus derived from the variability of the historic usage levels of the resources.

6. The data management process according to claim 1, wherein the comparing of each reservation with the actual capacity used by the user making the reservation is performed for a plurality of users such that the determining, for each user of the plurality of users, of the proportion of such reservations in which the actual capacity used deviates from the capacity reserved by the user is performed for the plurality of users; and
   the determined proportions of the users are aggregated; and
   the projected total a capacity requirement to meet the provisional reservations is adjusted based on the aggregated determined proportions.

7. An apparatus for monitoring an operation of a data management network, comprising:
   a store for recording records of actual use of resources of the data management network by a plurality of users, and records of provisional requests made for the resources,
   a demand analysis engine for receiving provisional requests for use of the resources and deriving an estimate of resources required to meet a projected total capacity required for each resource within the network required for the network to meet aggregate requirements of the users in each of a plurality of time slots, by comparing data relating to previous reservations made by each user of the plurality of users to reserve capacity during a session associated with each reservation with the data relating to actual usage by the respective users making the reservations during the session associated with each reservation and determining, for each user of the plurality of users, a value of a proportion of such reservations in which the actual usage deviates from a capacity reserved by the user, and aggregating each of the values of the proportion of such reservations in which the actual capacity used deviates from the capacity reserved by each user of the plurality of users, and
   a resource management system controlled by the demand analysis engine arranged to configure data processing resources to meet the projected total capacity required in each time slot.

8. The apparatus according to claim 7, further comprising a store of data relating to unreserved requests recorded by the resource management system, and wherein the demand analysis engine is arranged to receive the data relating to unreserved requests and use the data relating to unreserved requests in the generation of the projected total capacity required.

9. The apparatus according to claim 7, wherein the apparatus is configured to compare a record of previous reservations for the resources by the users with a record of previous actual use of the resources by the users to generate a prediction of under- or over-reservation of resources, so to generate an estimate of the resources needed to meet the received provisional requests.

10. The apparatus according to claim 9, wherein the apparatus is configured to monitor unreserved requests for resource and store a record of such requests, and generate a forecast of the resources required to meet unreserved requests over a period in respect of which the provisional reservations relate, such that the resource projected to meet the projected use relating to the provisional reservations and the unreserved requests is determined.

11. The apparatus according to claim 7, wherein the apparatus is configured to allocate resources and configure them to specific purposes to meet the projected total capacity required.

12. The apparatus according to claim 11, wherein the allocation of resources is based on the projected total capacity required with an additional contingency surplus derived from the variability of the historic usage levels of the resources.

13. The apparatus according to claim 7, wherein the comparing of the data relating to the previous reservations made by each user to reserve capacity during the session associated with each reservation with the data relating to actual usage by the respective users making the reservations is performed for a plurality of users such that the determining, for each user of the plurality of users, of the proportion of such reservations in which the actual capacity used deviates from the capacity reserved by the user is performed for the plurality of users; and
  the determined proportions of the users are aggregated; and
  the projected total capacity required to meet the provisional reservations is adjusted based on the aggregated determined proportions.

14. An apparatus for monitoring an operation of a data management network, comprising:
  a database configured to store records of actual use of resources of the data management network by a plurality of users, and records of provisional requests made for the resources by the plurality of users,
  a computer processor configured to:
  receive the provisional requests for use of the resources from the plurality of users;
  compare data relating to previous reservations made by each user of the plurality of users to reserve capacity during a session associated with each reservation with the data relating to actual usage by each respective user of the plurality of users making the reservations during the session associated with each reservation;
  estimating, for each user of the plurality of users, a measure of a level of use of each of the resources by each user of the plurality of users based on the compared data;
  aggregating the estimated measures of the level of use of the plurality of users making provisional requests made for the resources during the associated session;
  adjusting a predicted total demand for each of the resources based on the aggregation of the estimated measures of the level of use of the plurality of users; and
  control the resources to meet the predicted total demand as adjusted.

15. The apparatus according to claim 14, further comprising a database configured to store data relating to unreserved requests, and wherein the computer processor is further configured to receive the data relating to unreserved requests and use the data relating to unreserved requests to determine the predicted total demand.

* * * * *